United States Patent [19]

Yamawaki et al.

[11] Patent Number: 4,493,505
[45] Date of Patent: Jan. 15, 1985

[54] REAR SEAT OF AN AUTOMOBILE

[75] Inventors: Takeshi Yamawaki; Kunio Nishiyama, both of Okazaki, Japan

[73] Assignee: Toyota Jidosha Kabushiki Kaisha, Toyota, Japan

[21] Appl. No.: 485,110

[22] Filed: Apr. 14, 1983

[30] Foreign Application Priority Data

May 6, 1982 [JP] Japan .............................. 57-65849[U]

[51] Int. Cl.³ .............................................. B60N 1/00
[52] U.S. Cl. .................................... 296/63; 296/65 R; 297/452
[58] Field of Search ............... 296/63, 65 R, 37.16; 297/452, 378, 379, 380; 29/401.1, 469, 401.3

[56] References Cited

U.S. PATENT DOCUMENTS

| | | | |
|---|---|---|---|
| 2,955,644 | 10/1960 | Kramer | 296/65 R |
| 3,121,585 | 2/1964 | Krueger | 296/37.16 |
| 4,286,819 | 9/1981 | Inoue | 296/65 R |
| 4,372,607 | 2/1983 | Mizushima | 296/65 R |

Primary Examiner—Robert R. Song
Attorney, Agent, or Firm—Oblon, Fisher, Spivak, McClelland & Maier

[57] ABSTRACT

A rear seat of an automobile, capable of selectively securing thereto with either one of a separate type seat back divided into two sections in the widthwise direction of the automobile, the respective sections being forwardly foldable independently of each other, and including a frame which includes reinforcement members to reinforce the outer peripheries of the main panels, or a bench type seat back being integral in the widthwise direction of the automobile and forwardly foldable, wherein a frame of the bench type seat back is of such an arrangement that the right and left main panels in the separate type seat back are integrally connected through reinforcement members to each other in such a manner that the two main panels are parallelly arranged on the right and left.

8 Claims, 6 Drawing Figures

REAR SEAT OF AN AUTOMOBILE

BACKGROUND OF THE INVENTION

1. Field of the Invention

This invention relates to rear seats of automobiles, and more particularly to improvements in a rear seat of an automobile, capable of selectively securing thereto with either one of a separate type seat back divided into two sections in the widthwise direction of the automobile, the respective sections being forwardly foldable independently of each other, or a bench type seat back being integral in the widthwise direction of the automobile and forwardly foldable.

2. Description of the Prior Art

In the case of automobiles, especially automobiles of the so-called two box group such as passenger cars, station wagons and the like provided with a rear gate type hatch-back door, even if these cars are the same type, the rear seat back in the rear seat is selectively secured thereto, separate sections of the seat back being forwardly foldable independently of each other, or a bench type rear seat back having integrated right and left seat sections and being forwardly foldable, due to a difference in grade.

The separate type seat back or the bench type seat back is normally provided thereon with a main panel or panels and a frame or frames consisting of reinforcements to reinforce the outer periphery or peripheries of the main panel or panels. However, since the requirements for mechanical strength are different from one seat back to another, these frames have been produced separately of one another.

However, in order to produce frames exclusively used for the separate type seat back and the bench type seat back as described above, it is necessary to provide separate production facilities for each exclusive type of use, thus resulting in increased manufacturing costs.

Especially since the main panel constituting a portion of the frame must be formed by pressing a thin steel sheet and the main panel in the bench type seat back is particularly large-sized, there has been present the disadvantage of incurring a large cost due to the necessity of a pressing step.

SUMMARY OF THE INVENTION

It is therefore the primary object of the present invention to provide a rear seat of an automobile, wherein main panels in a separate type seat back can be utilized as a main panel in a bench type seat back, so that production facilities can be commonly used and manufacturing costs can be reduced to a great extent.

To this end, according to the invention, in a rear seat of an automobile, capable of selectively securing thereto with either one of a separate type seat back divided into two sections in the widthwise direction of the automobile, the respective sections being forwardly foldable independently of each other, and including a frame consisting of reinforcement members to reinforce the outer peripheries of the main panels, or a bench type seat back being integral in the widthwise direction of the automobiles and forwardly foldable, a frame of the bench type seat back is of such an arrangement that the right and left main panels in the separate type seat back are integrally connected through reinforcements to each other in such a state that the two main panels are parallelly arranged on the right and left.

Further, to this end, according to the invention, in the aforesaid rear seat of the automobile, a reinforcement member in the frame of the bench type seat back is formed by a pipe having a shape as to surround the outer peripheries of the two main panels parallelly arranged on the right and left.

Yet another aspect, for this end, according to the invention, involves the use in the aforesaid rear seat of the automobile of upper panels to be secured to the top end portions of the main panels of said separate type seat back are formed into a continuously integral upper panel secured to the top end portions of the right and left main panels parallelly arranged in the bench type seat back.

Still further, according to the invention, in the aforesaid rear seat of the automobile, upper panels to be secured to the top end portions of the main panels of said separate type seat back are connected by a reinforcement member into a integral upper panel secured to the top end portions of the right and left main panels parallelly arranged in the bench type seat back.

Further, according to the invention, in the aforesaid rear seat of the automobile, each of the frames in the separate type seat back comprises a main panel and an upper panel connected to the top end portion of the main panel, a side reinforcement member connected to the outboard side portion of the main panel in the widthwise direction of the automobile, a center reinforcement member connected to the central side portion of the main panel and a lower reinforcement member connected to the bottom portion of the main panel, and the frame in the bench type seat back is formed by connecting the right and left main frames in the separate type seat back through second reinforcement members in such a manner that the center reinforcement members are removed from the aforesaid right and left frames.

Still further, to this end, according to the invention, in the aforesaid rear seat of the automobile, the second reinforcement members comprise: a first and second upper reinforcement members being welded, thus clamping the aforesaid right and left upper panels from above and from below, in such a state that the right and left frames are parallelly arranged on the right and left after the center reinforcement members are removed; and a second and a third lower reinforcement members are welded, clamping the central portions of the right and left reinforcement members from above and from below.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE PREFERRED EMBODIMENTS

Detailed description will hereunder be given of the embodiments of the present invention with reference to the drawings.

Figure 1:
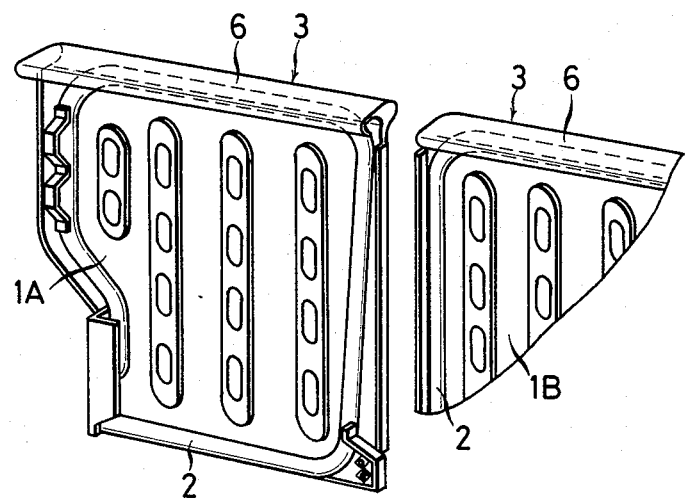
FIG. 1 is a perspective view showing the frame in the separate type seat back used in a first embodiment of the rear seat of an automobile according to the invention.
Figure 2:
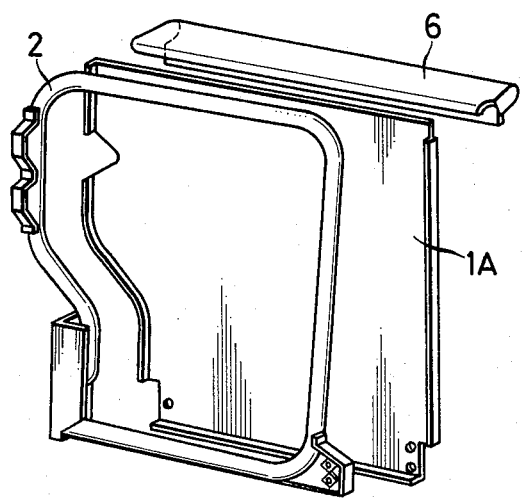
FIG. 2 is a disassembled perspective view thereof.

As shown in FIGS. 1 and 2, the first embodiment of the present invention is of such an arrangement that, in a rear seat of an automobile, capable of selectively securing thereto with either one of a separate type seat back (not generally shown) divided into two sections in the widthwise direction of the automobile, the respective sections being forwardly foldable independently of each other, and including a frame 3 consisting of main panels 1A and 1B, and reinforcement members 2 to reinforce the outer peipheries of these main panels 1A and 1B, or a bench type seat back (not generally shown) being integral in the widthwise direction of the automobile and forwardly foldable, a frame 4 of the bench type seat back being constructed such that the two right and left panels 1A and 1B in the separate type seat back are integrally connected through a reinforcement member 5 to each other in such a state that the two main panels 1A and 1B are parallelly arranged on the right and left.

Designated at reference numeral 6 in FIGS. 1 and 2 are upper panels to be secured to the top portions of the main panels 1A and 1B.

The reinforcement member 2 in the frame 3 and the reinforcement member 5 in the frame 4 are each formed by bending a pipe circular in cross section and welding the ends thereof.

Figure 3:
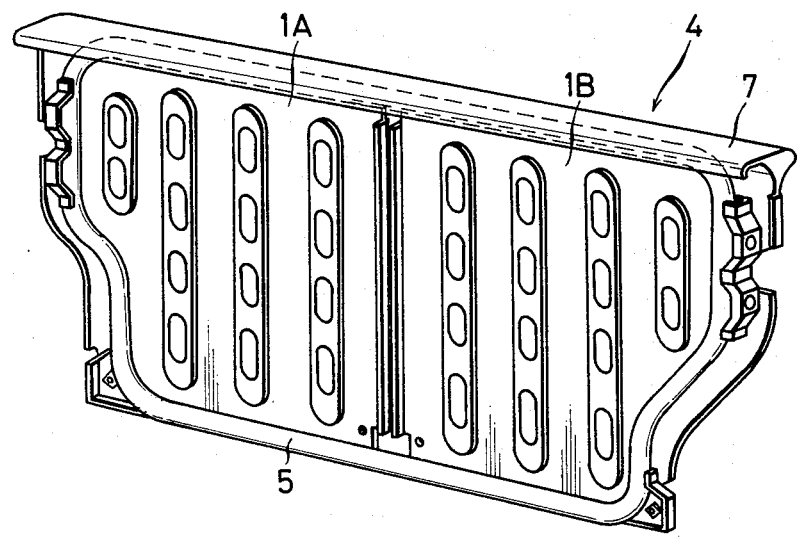
FIG. 3 is a perspective view showing the first embodiment.
Figure 4:
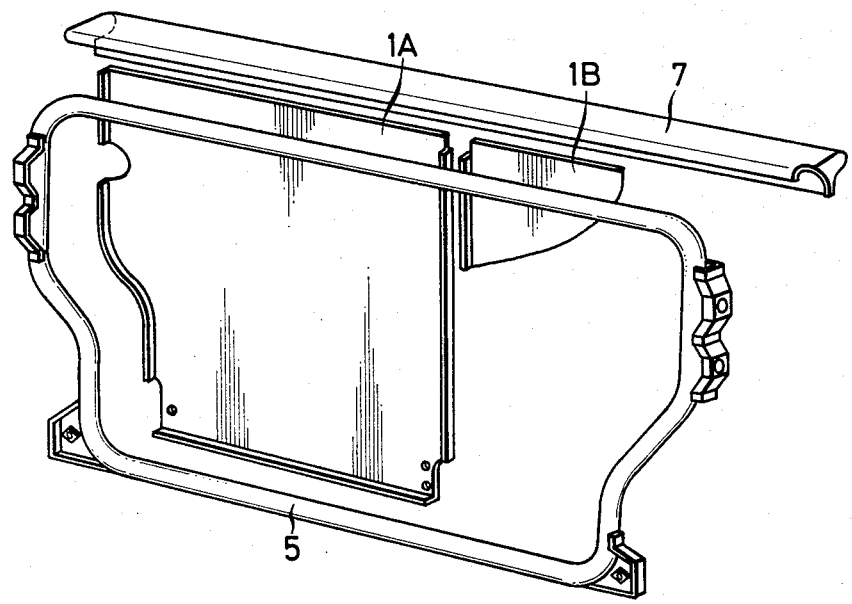
FIG. 4 is a disassembled peresspective view showing the first embodiment.

As shown in FIGS. 3 and 4, an upper panel 7 being continuously integral in the lateral direction is secured onto the top end portions of the main panels 1A, 1B and the reinforcement member 5.

Therefore, in this embodiment, the reinforcement members 2 and 5, both of which have high rigidity and are formed of pipes being inexpension both in terms of productive facilities and manufacturing costs, can be produced exclusively for the separate type seat back and the bench type seat back, and moreover, the main panels 1A and 1B in the form of large-size pressed products are interchangeable between the separate type seat back and the bench type seat back, so that the common use of the productive facilities for the both products and sharply decreased manufacturing costs can be achieved.

Figure 5:
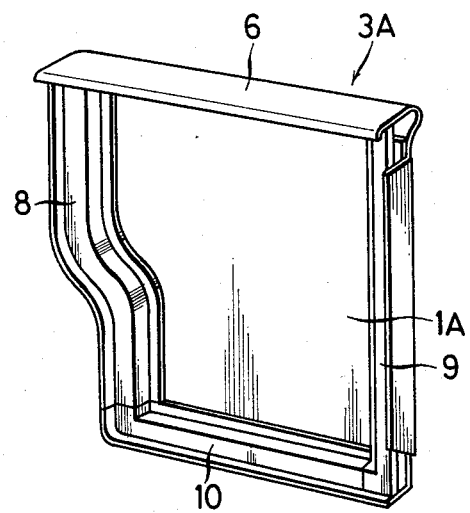
FIG. 5 is a perspective view showing the frame in the separate type seat back used in a second embodiment of the invention.
Figure 6:
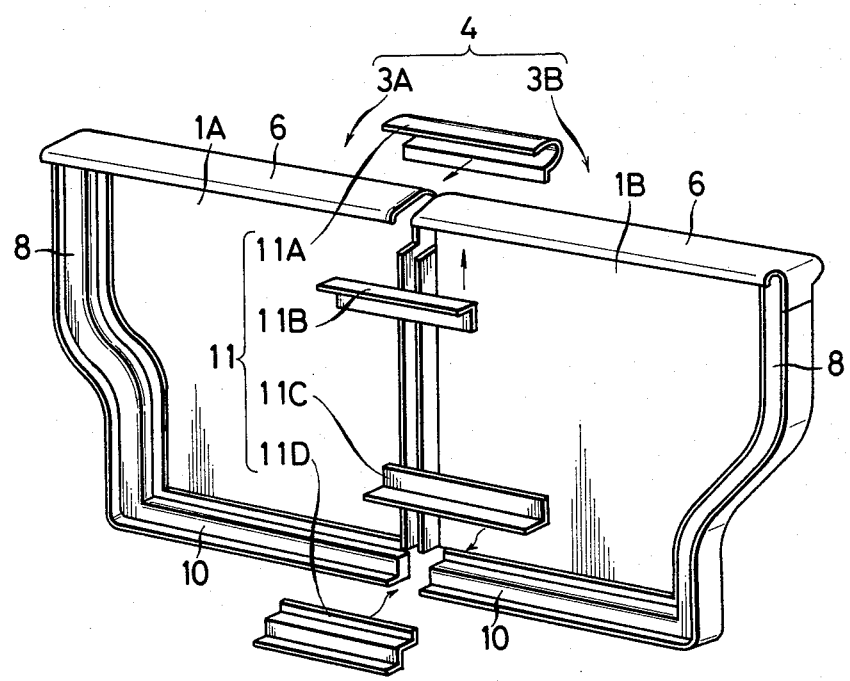
FIG. 6 is a disassembled perspective view showing the frame in the second embodiment of the invention.

Description will now be given of the second embodiment as shown in FIGS. 5 and 6.

In this second embodiment, each of the frames 3A and 3B in the separate type seat back comprises a main panel 1A, 1B, respectively and an upper panel 6 connected to the top end portion of each main panel 1A, 1B, a side reinforcement member 8 connected to the outboard side portion of the main panel 1 in the widthwise direction of the automobile, a center reinforcement member 9 connected to the central side portion of the main panel 1 and a lower reinforcement member 10 connected to the bottom portion of the main panel 1, and the frame 4 in the bench type seat back is formed by connecting the right and left frames 3A and 3B in the separate type seat back through second reinforcement members 11A-11D in such a state that the center reinforcement members 9 are removed from the aforesaid right and left frames 3A and 3B.

This second reinforcement members comprise a first and a second upper reinforcement members 11A and 11B being welded, clamping the aforesaid right and left upper panels 6 from above and from below, in such a state that the right and left frames 3A and 3B are parallelly arranged on the right and left after the center reinforcement members 9 are removed; and a third and fourth lower reinforcement members 11C and 11D being welded, clamping the central portions of the right and left lower reinforcements 10 from above and from below.

As a consequence, in this embodiment, the frames 3A and 3B in the separate type seat back, with the center reinforcement members 9 being removed, can be commonly used as the frame 4 of the bench type seat back, so that high interchangeability of parts can be achieved between the separate type seat back and the bench type seat back, thereby enabling to achieve the common use of the productive facilities and the sharp decrease in manufacturing costs.

In addition, in the first embodiment as shown in FIGS. 1 through 4, the upper panel 6 in the separate type seat back and upper panel 7 in the bench type seat back are formed separately of each other. However, the upper panel 7 in the bench type seat back may be formed by integrally connecting the right and left upper panels in the separate type seat back to each other through a reinforcement member in the same manner as in the second embodiment.

It should be apparent of those skilled in the art that the abovedescribed embodiments are merely representative, and which represent the applications of the principles of the present invention. Numerous and varied other arrangements can be readily devised by those skilled in the art without departing from the spirit and the scope of the invention.

What is claimed is:

1. A rear seat of an automobile, adapted to be selectively securing thereto as a separate type seat back, and divided into first and second sections in a widthwise direction of the automobile, the respective first and second sections being forwardly foldable independently of each other, or a bench type seat back being integral in the widthwise direction of the automobile and forwardly foldable, comprising:
   a frame having a first and second main panel; and
   at least one reinforcement member for reinforcing an outer peripheral portion of said first and second main panel wherein said frame when utilized in said bench type seat back is of such an arrangement that said first and second main panels are integrally connected through said at least one reinforcement member to each other and when utilized in said separate type seat back, said first and second main panels are parallelly arranged.

2. A rear seat of an automobile as set forth in claim 1, wherein said at least one reinforcement member in the frame utilized in the bench type seat back further comprises a pipe having a shape so as to surround the outer peripheral portion of said first and second main panel.

3. A rear seat of an automobile as set forth in claim 1, further comprising a first and second upper panel secured to top end portions, respectively, of the first and second main panels when utilized in said separate type seat back, said first and second, upper panels being formed into a continuously integral upper panel secured to the top end portions of the first and second main panels.

4. A rear seat of an automobile as set forth in claim 2, further comprising first and second upper panels secured to top end portions, respectively, of the first and second main panels when utilized in separate type seat back, said first and second upper panels being formed into a continuously integral upper panel secured to the top end portions of the first and second main panels.

5. A rear seat of an automobile as set forth in claim 1, further comprising a second reinforcement member interconnecting said first and second upper panel so as to form an integral upper panel.

6. A rear seat of an automobile as set forth in claim 4, further comprising a second reinforcement member interconnecting said first and second upper panel so as to form an integral upper panel.

7. A rear seat of an automobile as set forth in claim 3, wherein said at least one reinforcement member utilized in said separate type seat back further comprises a side reinforcement member connected to an outboard side portion of said first and second panels in said widthwise direction of the automobile, a center reinforcement connected to a central side portion of said first and second main panels and a lower reinforcement connected to a bottom portion of said first and second main panels, and further comprising a second reinforcement member interconnecting said first and second main frame within peripheral portions thereof.

8. A rear seat of an automobile as set forth in claim 7, wherein said second reinforcement member further comprises a first and second upper reinforcement member welded so as to clamp said upper panels from above and from below in such a state that said first and second frames are parallelly arranged; and a third and fourth lower reinforcement member welded so as to clamp central portions of the at least one reinforcement members from above and from below.

* * * * *